(12) United States Patent
Maluf et al.

(10) Patent No.: US 10,333,887 B2
(45) Date of Patent: Jun. 25, 2019

(54) INTERNET PROTOCOL (IP) NETWORK VIRTUALIZATION OF SERIAL NETWORK ENDPOINTS

(71) Applicant: Cisco Technology, Inc., San Jose, CA (US)

(72) Inventors: David A. Maluf, Mountain View, CA (US); Raghuram S. Sudhaakar, Fremont, CA (US); John Burns, Los Altos, CA (US); Jan Medved, Pleasanton, CA (US); Herbert Wildfeuer, Los Altos, CA (US); Klement Sekera, Bratislava (SK)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 15/236,918

(22) Filed: Aug. 15, 2016

(65) Prior Publication Data

US 2018/0048619 A1    Feb. 15, 2018

(51) Int. Cl.
| | |
|---|---|
| *H04L 29/12* | (2006.01) |
| *H04L 12/46* | (2006.01) |
| *H04L 12/40* | (2006.01) |
| *H04L 12/66* | (2006.01) |

(52) U.S. Cl.
CPC ............ *H04L 61/106* (2013.01); *H04L 12/40* (2013.01); *H04L 12/4625* (2013.01); *H04L 61/2007* (2013.01); *H04L 12/66* (2013.01); *H04L 2012/40215* (2013.01); *H04L 2012/40228* (2013.01); *H04L 2012/40273* (2013.01)

(58) Field of Classification Search
CPC ......... H04L 41/00–41/70; H04L 65/00–65/80; H04L 12/00–12/54
See application file for complete search history.

(56) References Cited

U.S. PATENT DOCUMENTS

| | | | | |
|---|---|---|---|---|
| 6,654,355 | B1* | 11/2003 | Marbach ............. | H04L 12/4135 370/285 |
| 2004/0010323 | A1* | 1/2004 | Martin ................ | H04L 41/0213 700/3 |
| 2004/0133704 | A1* | 7/2004 | Krzyzanowski .... | H04L 12/2814 709/250 |
| 2011/0142061 | A1* | 6/2011 | Wang .................. | H04L 12/2834 370/401 |

(Continued)

*Primary Examiner* — Clayton R Williams
(74) *Attorney, Agent, or Firm* — Behmke Innovation Group LLC; James Behmke; Stephen D. LeBarron

(57) ABSTRACT

In one embodiment, a network device connected to an Internet Protocol (IP) network and a serial network scans an infrastructure of the serial network. Based on the scanning, the network device can determine one or more serial endpoints within the serial network infrastructure, and may then allocate an IP address to each of the one or more serial endpoints. The network device may then map received IP network traffic into serial protocol commands on the serial network for a destination serial endpoint having an allocated IP address corresponding to a destination IP address of the received IP network traffic, and may also bridge data present on the serial network from a sourcing serial endpoint into an IP message on the IP network with an indication of a corresponding allocated IP address of the sourcing serial endpoint, accordingly.

20 Claims, 10 Drawing Sheets

(56) References Cited

U.S. PATENT DOCUMENTS

| | | | |
|---|---|---|---|
| 2014/0032734 A1* | 1/2014 | Shigeeda | H04L 61/2015 709/223 |
| 2014/0136671 A1* | 5/2014 | Drake | G06F 9/541 709/223 |
| 2015/0117463 A1* | 4/2015 | Nelsen | H04L 12/4625 370/402 |

* cited by examiner

| ENDPOINT 710 | IP ADDRESS 720 | INFORMATION 730 |
|---|---|---|
| EP1 | IP1 | "INFO 1" |
| EP2 | IP2 | "INFO 2" |
| ... | ... | ... |
| EPN | IPN | "INFO N" |

FIG. 7

INTERNET PROTOCOL (IP) NETWORK VIRTUALIZATION OF SERIAL NETWORK ENDPOINTS

TECHNICAL FIELD

The present disclosure relates generally to computer networks, and, more particularly, to Internet Protocol (IP) network virtualization of serial network endpoints.

BACKGROUND

Many serial network endpoints, such as sensors and actuators found in vehicular or industrial systems, are specifically tailored to function based on a proprietary serial communication protocol, such as the on-board diagnostics (OBD) protocol, controller area network (CAN) bus protocol, etc. Generally, such endpoints are natively non-IP enabled (i.e., are not an IP-enabled endpoint), and the commands and data consumption io occurs on a device also a part of the serial network (e.g., a controller).

Efforts have been made to establish IP-enabled gateway configurations, where serial devices (sensors and actuators) can connect to the gateway through the serial interfaces. Existing solutions, however, only copy data from serial interfaces to the IP network as a simple payload. That is, data transparent at the serial interface can represent is many endpoints multiplexed through the interface, though these endpoints are not transparent to the gateway, which is only configured to "pipe" whatever data is on the serial interface to a specific destination in the IP network for remote consumption and decoding by a serial decoder connected to the IP network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example view of a shared listing of IP address assignments for network virtualization of serial network endpoints;

DESCRIPTION OF EXAMPLE EMBODIMENTS

Overview

Figure 1:
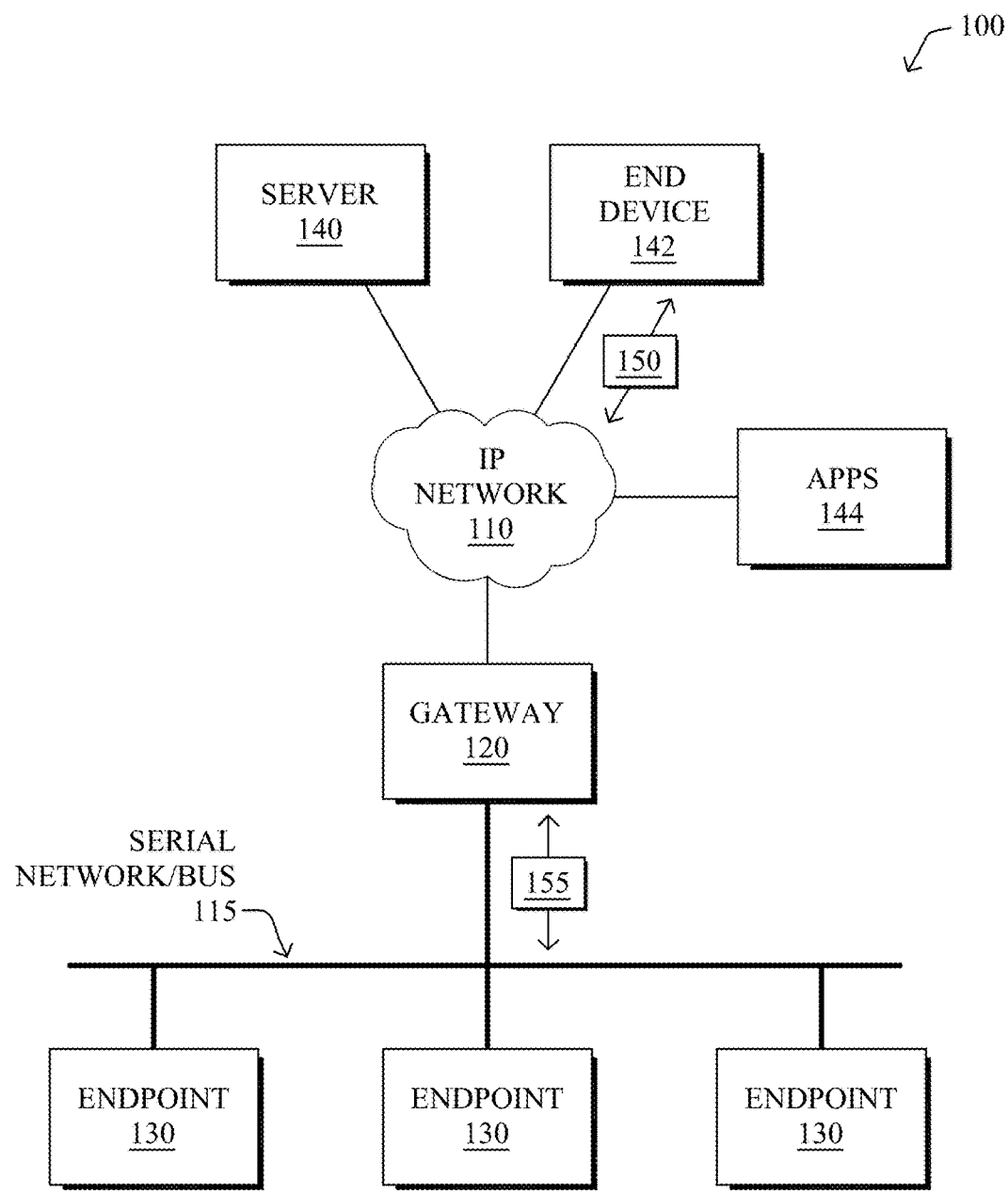
FIG. 1 illustrates an example communication network.

According to one or more embodiments of the disclosure, a network device connected to an Internet Protocol (IP) network and a serial network scans an infrastructure of the serial network. Based on the scanning, the network device can determine one or more serial endpoints within the serial network infrastructure, and may then allocate an IP address to each of the one or more serial endpoints. The network device may then map received IP network traffic into serial protocol commands on the serial network for a destination serial endpoint having an allocated IP address corresponding to a destination IP address of the received IP network traffic, and may also bridge data present on the serial network from a sourcing serial endpoint into an IP message on the IP network with an indication of a corresponding allocated IP address of s the sourcing serial endpoint, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical is lightpaths, synchronous optical networks (SONET), synchronous digital hierarchy (SDH) links, and others.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Networks may also be, or may include, an "Internet of Things" or "IoT" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are is connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Serial networks are another type of network, different from an IP network, typically forming a localized network in a given environment, such as for automotive or vehicular networks, industrial networks, entertainment system networks, and so on. For example, those skilled in the art will be familiar with the on-board diagnostics (OBD) protocol (a serial network which supports a vehicle's self-diagnostic and reporting capability, including the upgraded "OBD II" protocol), the controller area network (CAN) bus (or CAN-BUS) protocol (a message-based protocol to allow microcontrollers and devices to communicate with each other in applications without a host computer), and the MODBUS protocol (a serial communications protocol for use with programmable logic controllers, such as for remote terminal units (RTUs) in supervisory control and data acquisition (SCADA) systems). Unlike an IP-based network, which uses a shared and open addressing scheme, a serial communication network generally is based on localized and proprietary communication standards, where commands or data are transmitted based on localized device identifiers, such as parameter identifiers (PIDs), localized station addresses, and so on.

FIG. 1 is a schematic block diagram of a simplified example computer system 100 illustratively comprising an Internet Protocol (IP) network 110 and a serial network/bus 115, along with a gateway (or other network device) 120 interconnecting the two networks, as described in greater detail below. Serial network 115, in particular, illustratively comprises one or more endpoints 130 (e.g., a set of one or more controlled devices, sensors, actuators, controllers, processors, and so on), such as part of a vehicular network, an industrial network, etc. The endpoints may be interconnected by various methods of serial communication. For instance, the serial network/bus 115 may allow the endpoints 130 to communicate serial data 155 (e.g., commands, sensor data, etc.) using predefined serial network communication protocols (e.g., OBD, CANBUS, MODBUS, etc.). In this context, a serial network protocol consists of a set of rules defining how the endpoints interact within the serial network 115.

IP network 110, on the other hand, illustratively comprises links interconnecting one or more devices through a network of routers or switches. For example, a set of one or more servers (or controllers) 140, one or more end devices (e.g., user devices, workstations, etc.) 142, and one or more other application devices 144 may be interconnected with the IP network 110. The devices, generally, may be interconnected by various methods of IP-based communication. For instance, the links may be wired links or shared media (e.g., wireless links, PLC links, etc.) where certain devices may be in communication with other devices, e.g., based on distance, signal strength, current operational status, location, etc. IP data packets 150 (e.g., traffic and/or messages sent between the devices/nodes) may be exchanged among the nodes/devices of the IP network 110 using predefined IP network communication protocols such as the transmission control protocol (TCP), TCP/IP, user datagram protocol (UDP), or other protocols where appropriate. In this context, an IP network protocol consists of a set of rules defining how the nodes interact with each other over the IP network 110.

As described below, the gateway device 120 illustratively bridges both the IP s network 110 and serial network 115, and as such may be considered to be a part of either or each network, accordingly. Further, those skilled in the art will understand that any number of nodes, devices, links, endpoints, etc. may be used in the computer system 100, and that the view shown herein is for simplicity. Also, those skilled in the art will further understand that while the system is shown in a certain orientation, system 100 is merely an example illustration that is not meant to limit the disclosure.

Figure 2:
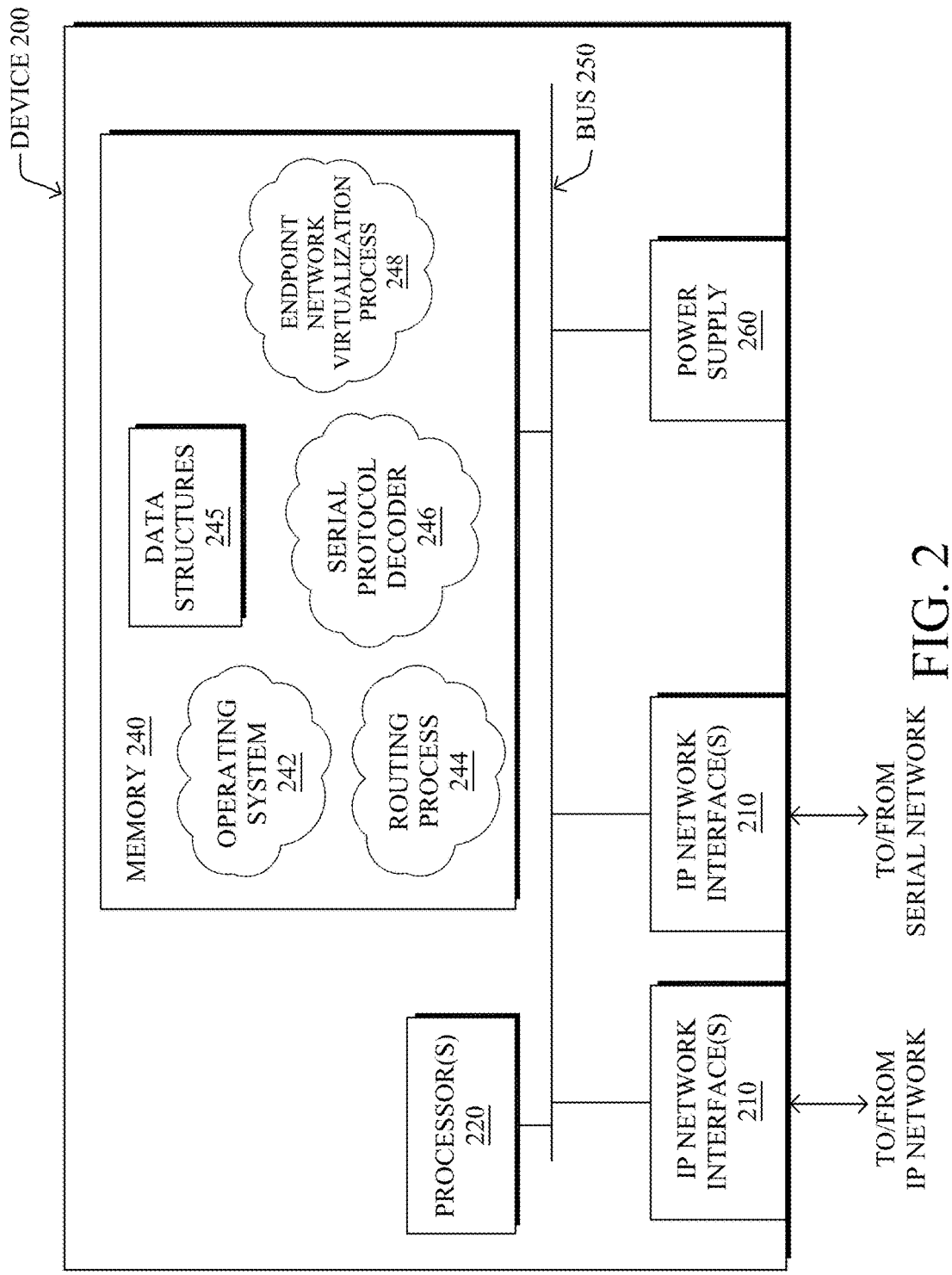
FIG. 2 illustrates an example network device/node.

FIG. 2 is a schematic block diagram of an example node/device 200 that may be used with one or more embodiments described herein, e.g., as any of the nodes/devices shown in FIG. 1 above, particularly as the gateway device 120 as described herein. The device may comprise one or more IP network interfaces 210 (e.g., wired, wireless, PLC, is etc.), one or more serial network interfaces 215 (e.g., a data link connector or DLC), at least one processor 220, and a memory 240 interconnected by a system bus 250, as well as a power supply 260 (e.g., battery, plug-in, etc.).

The IP network interface(s) 210 include the mechanical, electrical, and signaling circuitry for communicating data over links coupled to the IP network 110. The network interfaces 210 may be configured to transmit and/or receive data using a variety of different IP communication protocols, such as TCP/IP, UDP, etc. Note that the device 200 may have multiple different types of IP network connections 210, e.g., wireless and wired/physical connections, and that the view herein is merely for illustration. Also, while the IP network interface 210 is shown separately from power supply 260, for PLC the network interface 210 may communicate through the power supply 260, or may be an integral component of the power supply. In some specific configurations the PLC signal may be coupled to the power line feeding into the power supply.

The serial network interface(s) 215, on the other hand, include the mechanical, electrical, and signaling circuitry for communicating data over links coupled to the serial network 115. The network interfaces 215 may be configured to transmit and/or receive data using a variety of different serial communication protocols, such as OBD, CANBUS, MODBUS, etc., on any range of serial interfaces such as legacy universal asynchronous receiver/transmitter (UART) serial interfaces and modern serial interfaces like universal serial bus (USB).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244, a serial protocol decoder 246, and an illustrative endpoint network virtualization process 248, as described herein. Note that while processes are shown in centralized memory 240, alternative embodiments provide for the process to be specifically operated within the network interfaces 210/215.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing (e.g., IP) protocols, such as proactive or reactive routing protocols as will be understood by those skilled in the art. These functions may, on capable devices, be configured to manage a routing/forwarding table (a data structure 245) including, e.g., data used to make routing/forwarding decisions for IP network 110. In particular, in proactive routing, s connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination.

As noted above, many serial network endpoints, such as sensors and actuators found in vehicular or industrial systems, are specifically tailored to function based on a proprietary serial communication protocol, where generally such endpoints are natively is not enabled for IP communication. That is, the commands and data consumption for such endpoints occurs on a device also a part of the serial network. As also noted above, though efforts have been made to establish IP-enabled gateway configurations (connecting serial devices to an IP gateway) existing solutions only copy data from serial interfaces to the IP network as a simple payload. Since data transparent at the serial interface can represent many endpoints multiplexed through the interface, when these endpoints are not transparent to the gateway (configured only to copy/send whatever data is on the serial interface), only a specific serial decoder in the IP network that is configured as the destination receives the data for remote consumption and decoding.

—IP Network Virtualization of Serial Network Endpoints—

The techniques herein generally relate to discovering endpoints and creating a complete network virtualization over multi-serial type interfaces. The separation and isolation of the components (serial devices) discovered over serial interfaces of private networks (e.g., LAN) is a key factor to achieve a complete solution for IOT as the edge touches the sensor level. In particular, most sensors and actuators hide behind serial protocols (e.g., OBD, CANBUS, and MODBUS), and these protocols were not intended to be connected to the internet. Most prior techniques in this space merely encapsulated solutions into specific applications. The techniques herein, on the other hand, actually presents a natural bridge of the underlying serial network into a LAN to be addressed, s virtually as if it were a true network obeying all network rules (e.g., network address translation (NAT), firewall bridging, gateway services, and so on).

Specifically, according to one or more embodiments of the disclosure as described in detail below, a network device connected to an IP network and a serial network scans an infrastructure of the serial network. Based on the scanning, the network device can determine one or more serial endpoints within the serial network infrastructure, and may then allocate an IP address to each of the one or more serial endpoints. The network device may then map received IP network traffic into serial protocol commands on the serial network for a destination serial endpoint having an allocated IP address corresponding to a destination IP address of the received IP network traffic, and may also bridge data present on the serial network from a sourcing serial endpoint into an IP message on the IP network with an indication of a corresponding allocated IP address of the sourcing serial endpoint, accordingly.

Illustratively, the techniques described herein may be performed by hardware, software, and/or firmware, such as in accordance with the illustrative endpoint network virtualization process 248, which may include computer executable instructions executed by the processor 220 (or independent processor of interfaces 210) to perform functions relating to the techniques described herein, e.g., in conjunction with routing process 244 as described above, and particularly the serial protocol decoder 246, which is configured to decode the data from the serial network 115. These processes and software illustratively reside in a gateway 120 or any similar IP-enabled platform that interacts with serial interfaces for serial network 115. Also, as mentioned above, endpoints at the other end of the serial interface may uses raw data or any serial protocols like CANBUS, OBD, OBD-II, MODBUS, etc., for which the serial protocol decoder may be generally configured or specifically configured to interpret data according to the specific protocol encoding used by the associated endpoints 130.

Figure 3:
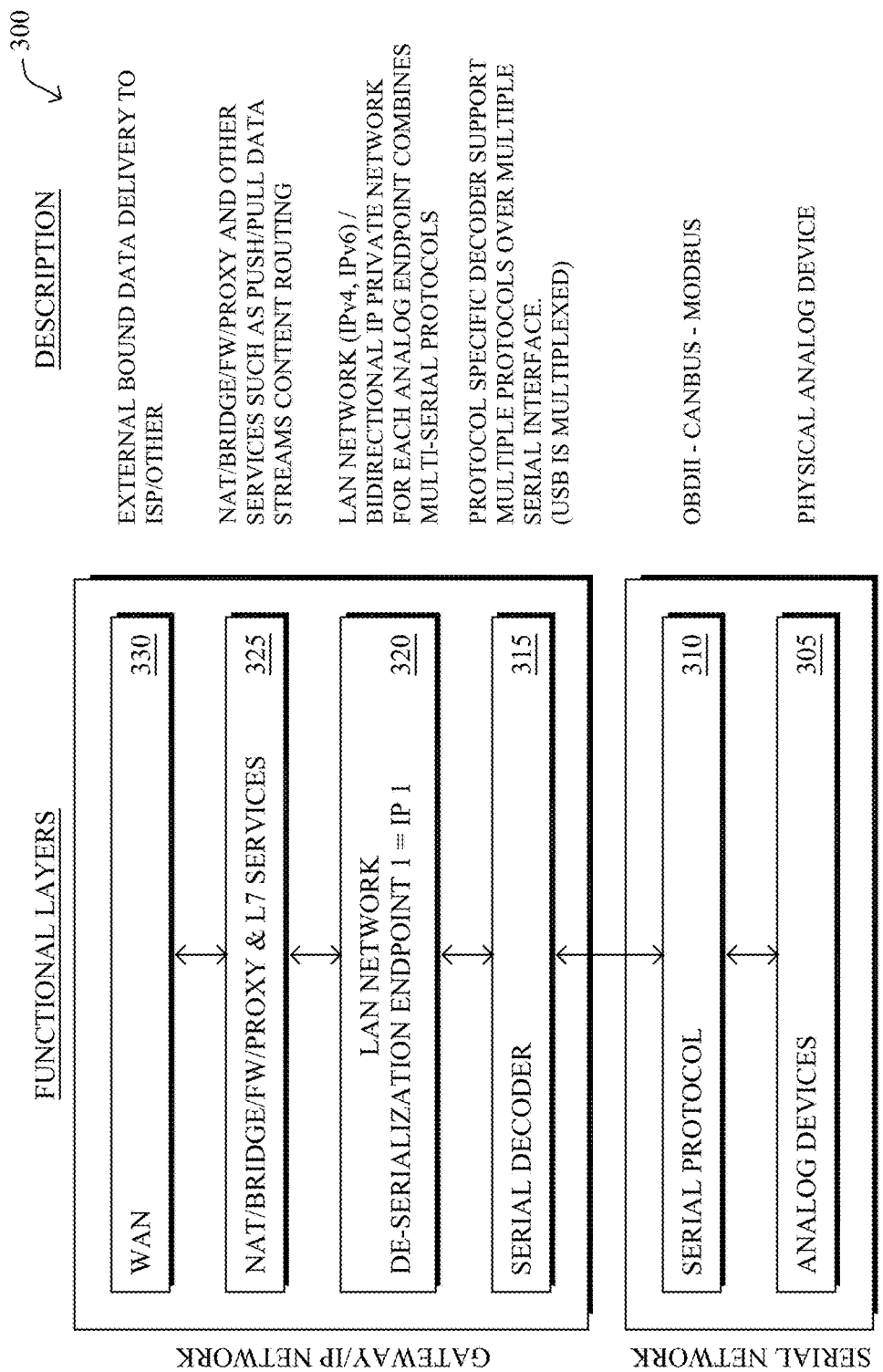
FIG. 3 illustrates an example view of IP network virtualization of serial network endpoints.

Operationally, the techniques herein go beyond the known capabilities of merely decoding the data presented to the serial interface. With reference to FIG. 3, and as s described in greater detail below, illustrative functional layers 300 of IP network virtualization of serial network endpoints according to the techniques herein are shown. In particular, the serial network consists of one or more analog device 305 (endpoints 130) communicating using a serial protocol 310. The serial decoder 315 (process 246 of gateway 120) translates between the serial protocol 310 and an IP network/LAN 320 (IPv4, IPv6, etc.) as described herein. Once on the IP network, the traffic receives the benefit of IP services 325, such as network address translation (NAT), bridging, firewalling, proxying, and other services such as push/pull data streams and content routing. In this manner, the IP traffic may reach a WAN 330 (e.g., the Internet or other IP-based network), thus providing external bound data delivery to an Internet Service Provider (ISP) or other network.

Figure 4:
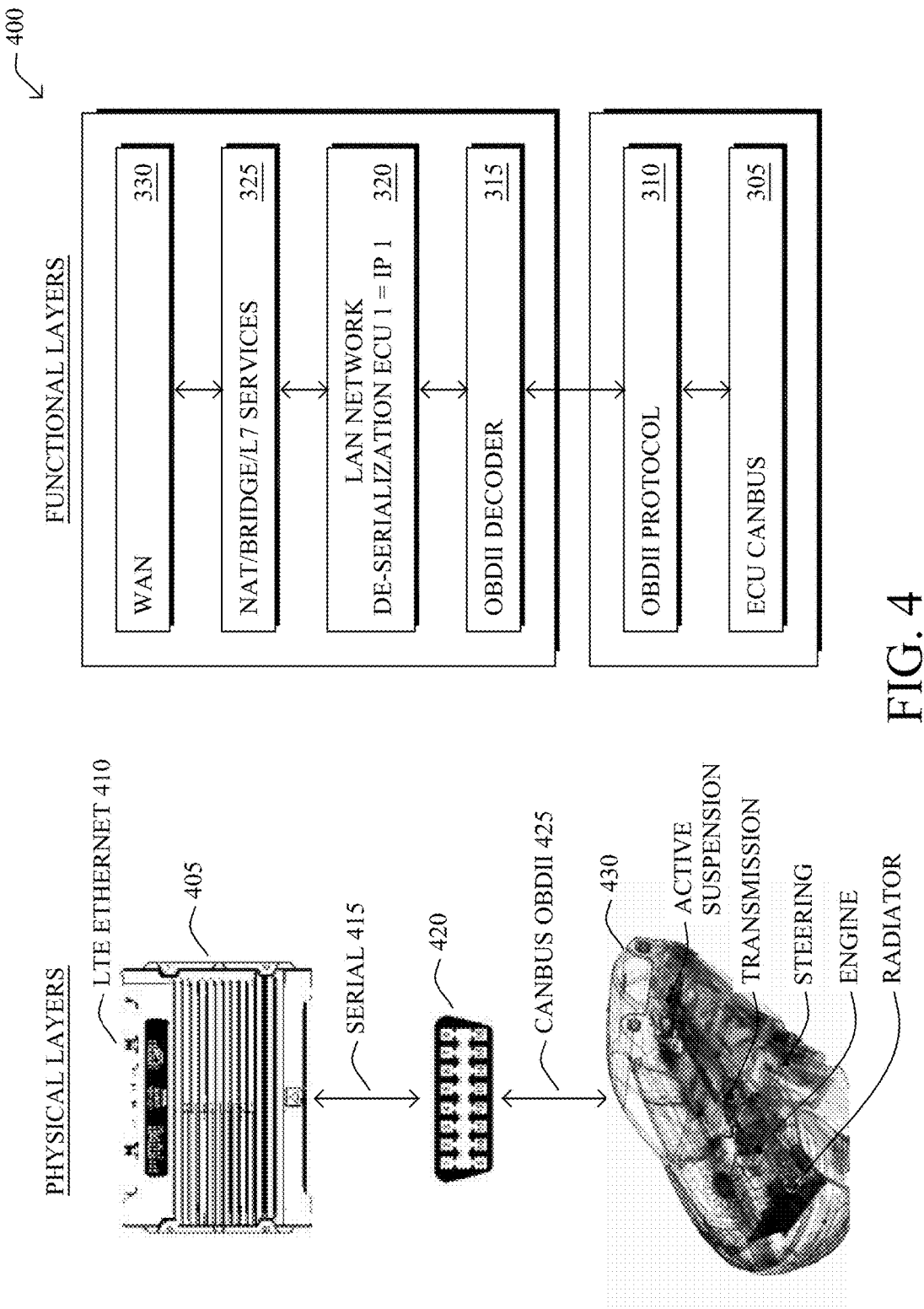
FIG. 4 illustrates another example view of IP network virtualization of serial network endpoints within an example automotive serial network.

As a simple example, FIG. 4 illustrates the use case 400 for an automotive/vehicular network, where a gateway 405 communicates over an IP network link 410, e.g., Ethernet or LTE (cellular), as well as over a serial link 415, such as to a serial port 420 (e.g., DLC, such as an OBD-II port). The serial port 420 connects to the serial network 425, such as a CANBUS/OBD-II protocol network of a vehicle 430 with various serial endpoints.

Figure 5:
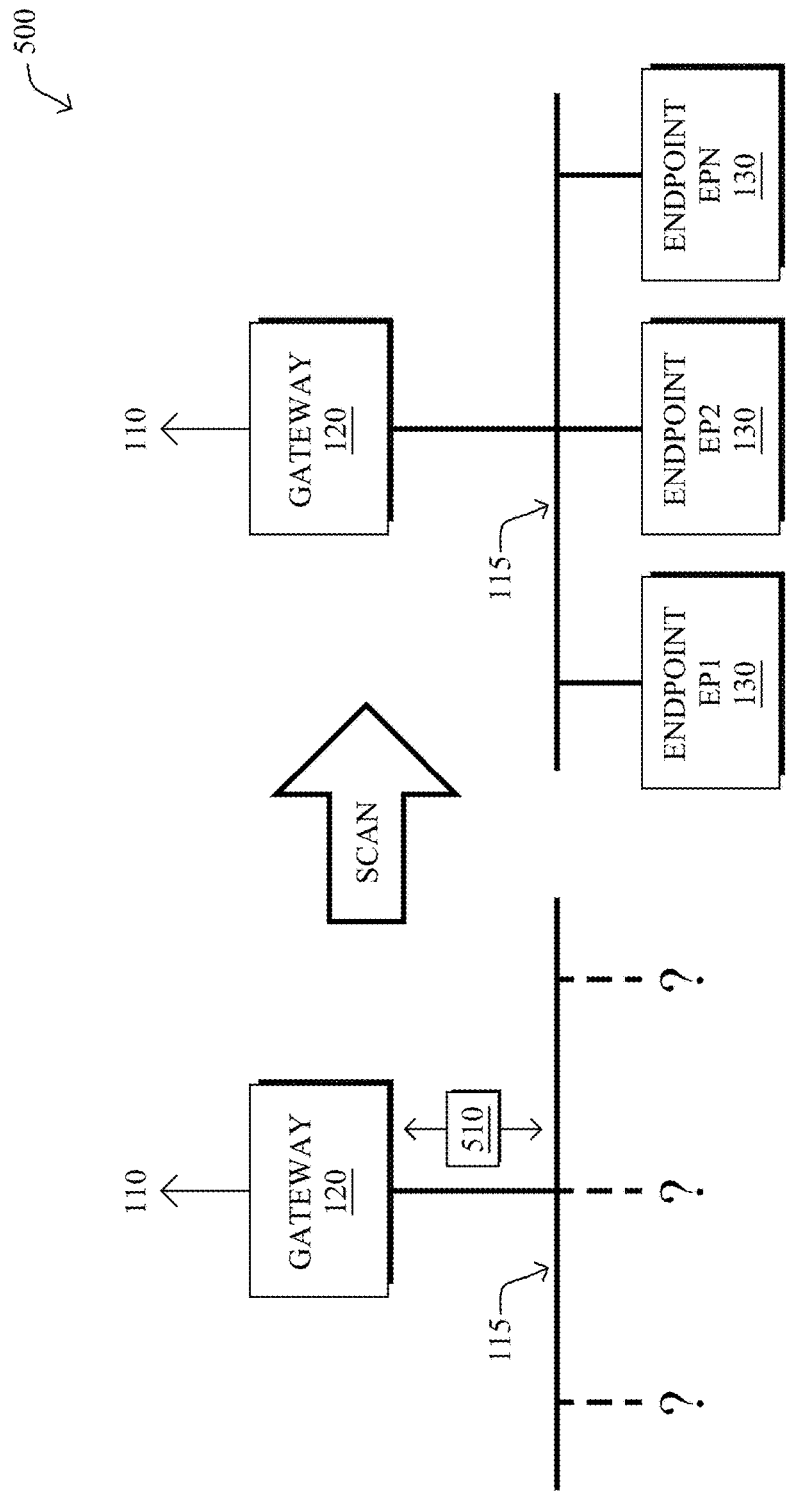
FIG. 5 illustrates an example view of scanning for serial network endpoints.
Figure 6:
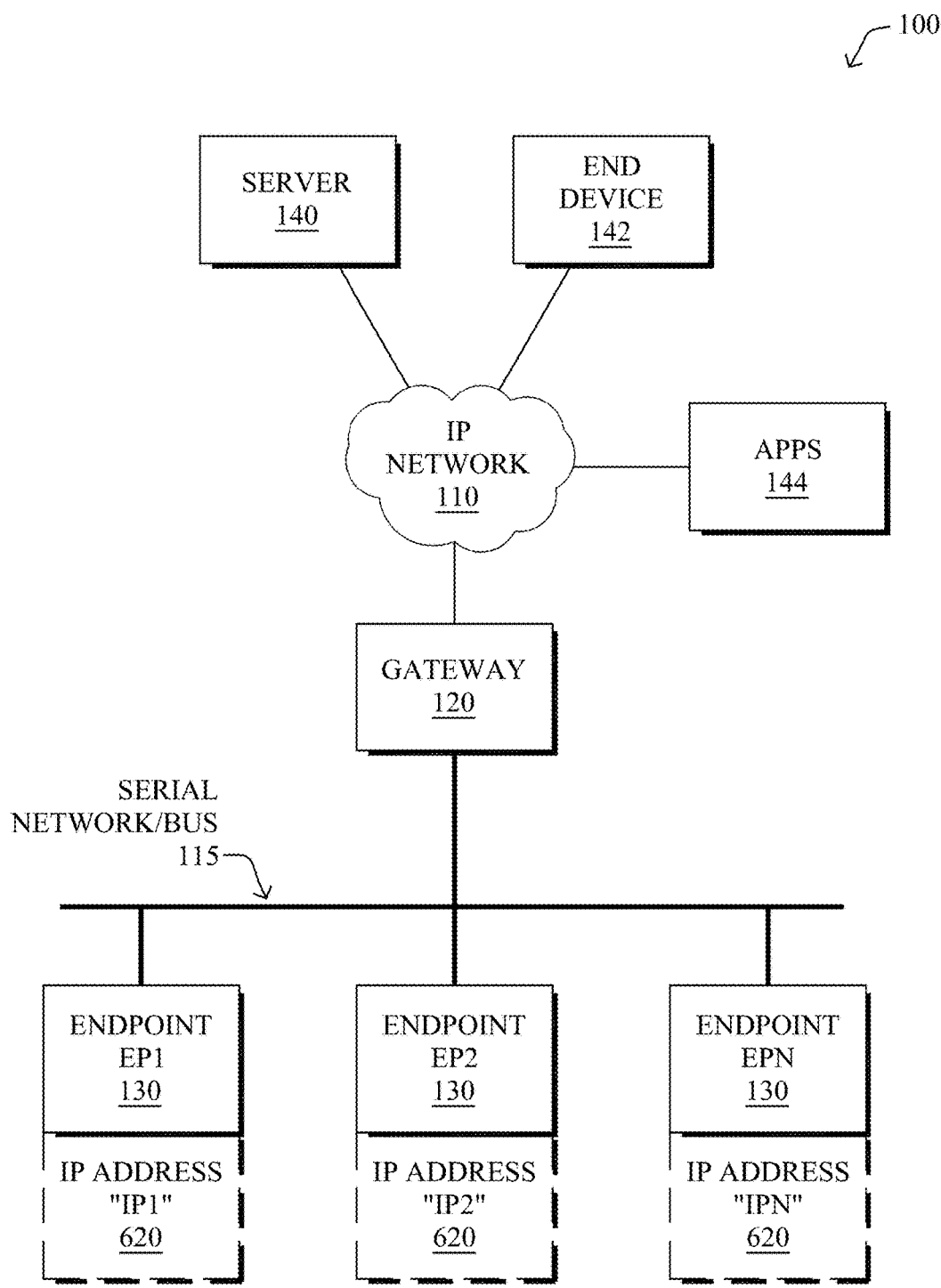
FIG. 6 illustrates an example view of IP address assignment for network virtualization of serial network endpoints.

According to the techniques herein, and with reference to FIG. 5, the embodiments begin by attempting to scan the underlying serial infrastructure based the needed protocol like OBD-II. For example, the gateway 120 may either "listen" to exchanges 510, or may initiate them (e.g., probes, requests, beacons, etc.). Once the results are received, the gateway device may thus determine the set of endpoints 130 in the serial network, such as endpoints EP1, EP2, EPN, etc. The discovered endpoints may then be processed to determine the endpoints' type, functionality, role, etc., and then referring to FIG. 6, may be virtualized into an IP-enabled LAN. That is, each endpoint 130 (EP1-EPN) discovered by the scan procedure may be dynamically allocated an IP address 620 to be associated with the endpoint such as IP1, IP2, IPN, etc. As an example, a scan for an OBD-II interface for a vehicle can result in many dozens and even hundreds of endpoints, and thus just as many corresponding new IP addresses.

Notably, the IP addresses that are assigned/allocated may be selected based on one or more policies and/or configuration mappings. For instance, an example arbitrary IPv4 address is "192.168.2.76". Since an address may be based on whether the IPs must be private or publicly addressable, the example selection of "192.168" may be based on a preset LAN mask to establish this address as private (as will be appreciated by those io skilled in the art). In addition, the "2.76", on the other hand, may be arbitrary, or may specifically reflect the specific nature of the endpoint, such as type of endpoint, role, function, type of commands. Any addressing scheme may be used according to the techniques herein, such as certain types of mappings, certain number ranges, or other schemes that provide insight into the underlying endpoint (e.g., as determined by the is gateway itself and advertised into the network, or else as dictated by an external control device (e.g., server) that requires specific IP addresses be assigned to particular endpoints). Note that the addressing schemes shown and mentioned in the present disclosure are merely examples that are not meant to be limited to the scope of the embodiments herein.

As shown in FIG. 7, a table (or list) 700 may keep track of the mappings from an endpoint identification 710 to an IP address 720, as well as any other relevant information 730, such as type/function/etc. of the endpoints. Information 730 may also include any other correlations or state information for endpoints, such as which server(s) may be interested in receiving data from a given endpoint, as described herein. This meta data table 700 may be created given the allocation of IP addresses to the devices given the underlying knowledge of the serial network (e.g., mapping the endpoints to specific functionality based on knowing what to expect within the serial network), as opposed to other discovery techniques (e.g., identification by the endpoints, external server lookup and/or correlation, etc.). Once the information is assembled, it may be shared with one or more interested devices in the network, such as through general advertising, unicast informing, publish/subscribe models, and so on. As an example, based on such a table 700, the following mapping and information for a set of vehicle ECUs (electronic control units) may be managed by the gateway 120 according to the techniques herein:

```
(- Endpoint ID 710 : IP Address 720 ... Function 730)
- ECU 10 : 192.168.2.110 ... Gas;
- ECU 11 : 192.168.2.111 ... Engine Temp;
- ECU 12 : 192.168.2.112 ... Tire Pressure;
Etc.
```

In addition, informational mapping may also be maintained or otherwise derived, such as which devices to stream given information to from particular endpoints:
STREAM: 10.154.249.227/192.168.2.112—LOW PRESSURE;
STREAM 10.154.201.201/192.168.2.110—ENGINE LIGHT ON.

Figure 8:
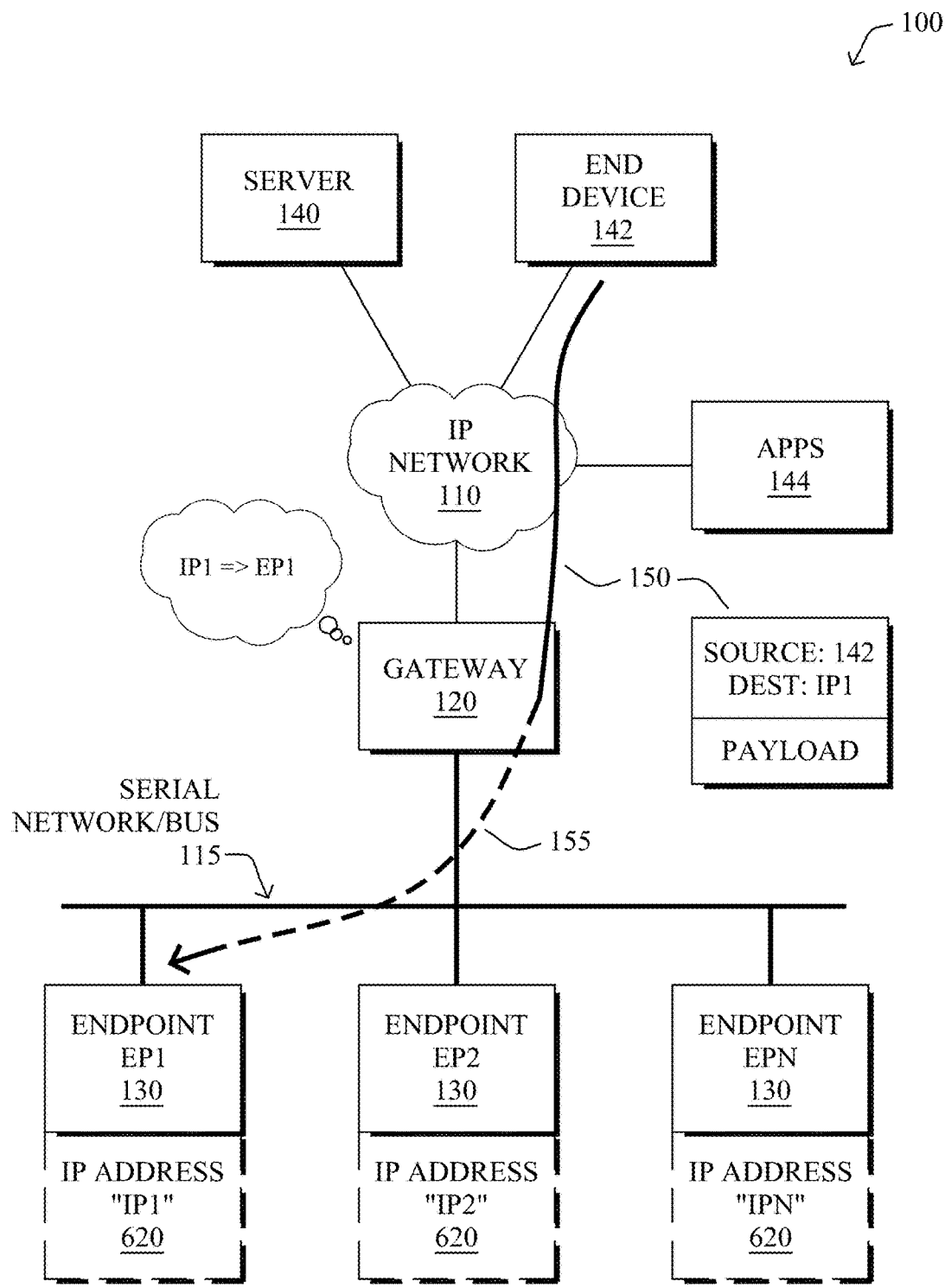
FIG. 8 illustrates an example view of mapping IP messages to serial communications for IP network virtualization of serial network endpoints.
Figure 9:
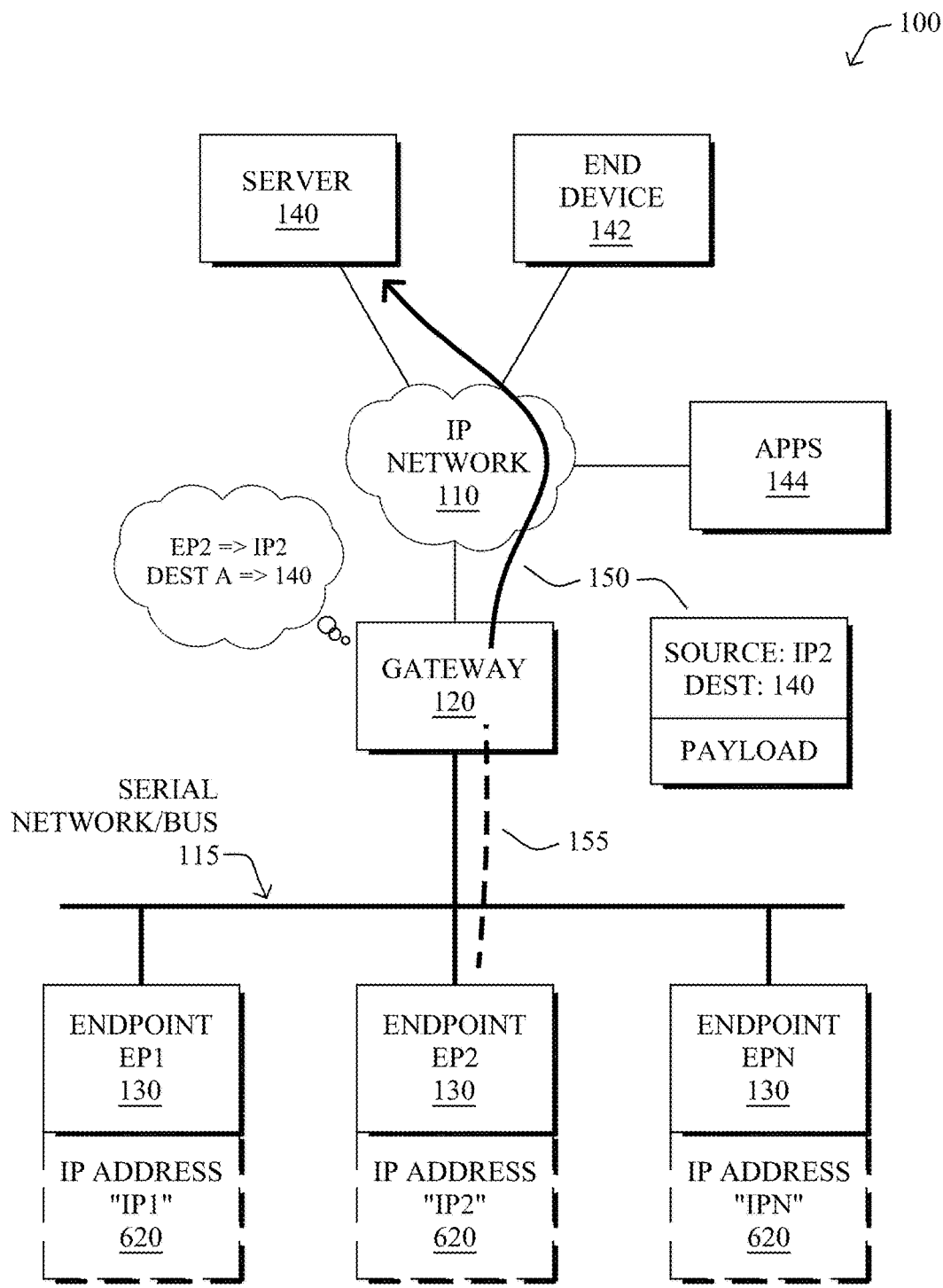
FIG. 9 illustrates an example view of bridging serial communications into IP is messages for IP network virtualization of serial network endpoints.

With reference to FIGS. 8-9, the gateway 120 may act as the intermediary is between IP network 110 and the serial network 115, passing messages (e.g., commands, requests, data, responses, handshakes, etc.) between the serial endpoints 130 and the IP-networked devices (e.g., 140, 142, 144, etc.). For instance, in FIG. 8, the gateway 120 may receive a command or request IP packet 150 (e.g., from end device 142) that has a destination IP address of IP1. According to the example above, the gateway 120 knows that IP1 was allocated to endpoint EP1, and as such, maps the IP message 150 into an appropriately directed serial message 155 to EP1, such as by converting the message (e.g., command/request) into the appropriate serial protocol message 155 (e.g., based on serial protocol decoder (encoder) 246.

Conversely, in FIG. 9, de-serialization from endpoint EP2 (with IP address IP2) may occur when the gateway 120 detects/receives a serial protocol message 155, and decodes the message to determine the appropriate course of action. For instance, the serial protocol message 155 may actually indicate the destination IP address for server 140, though more likely the non-IP-enabled serial endpoint can only provide an indication of the destination, such as "dest A" in an corresponding serial protocol field to indicate the intended recipient. In still other serial protocols, the endpoint provides no indication of the destination, and merely identifies itself (EP2) and its data payload. In s either of these second two instances, the gateway 120 may be configured to determine the appropriate destination IP address, such as by either converting the pseudo-destination (e.g., "dest A") into an IP address for server 140, or else making a determination based on some other manner, such as maintaining state (e.g., server 140 just asked EP2 for the data), being aware of intended destinations (e.g., server 140 is always the one to receive messages or these types of messages from EP2), and so on. Note that other schemes may be used, such as publish-subscribe, multicast, broadcast, etc., where the gateway 120 can range from being a bridge between serial and IP networks, to being an active participant in the interpretation and management of the data within the passed messages. It should also be noted that the source address of the IP message 150 in FIG. 9 may be that of the gateway 120, or else may be the allocated address IP2 for endpoint EP2, depending upon the configuration of the system.

The techniques herein therefore complements the serial network 115 with a series of services such as TCP raw telemetry over IP per endpoint, hyper-text transmission protocol (HTTP), and other known Layer 7 protocols to serve the endpoints data over the IP network (e.g., secure socket layer or SSL). Said differently, the techniques herein bridge the low-end serial protocols into IP stack-based protocols, and function as a network layer virtual bridge/proxy: Any network traffic to any specific IP address is mapped to its serial counterpart protocol commands and, reversely, any data present to the serial interface is bridged to the corresponding IP address to be served either as UDP, TCP, or other layer 7 network protocols.

Notably, the techniques herein allow existing sensor deployments (a.k.a. brown field deployments) to leverage the full capabilities of IP and other network-based protocols. For example, granular security applications, which are of high importance while on-boarding sensors onto an IP network, become possible. Also, the choice of such protocols is kept open, giving the user a choice in the design of future environments. This is a significant improvement over the state of-the-art where virtualizing sensors only exists via custom implementations, which limit the options available to the end user.

Figure 10:
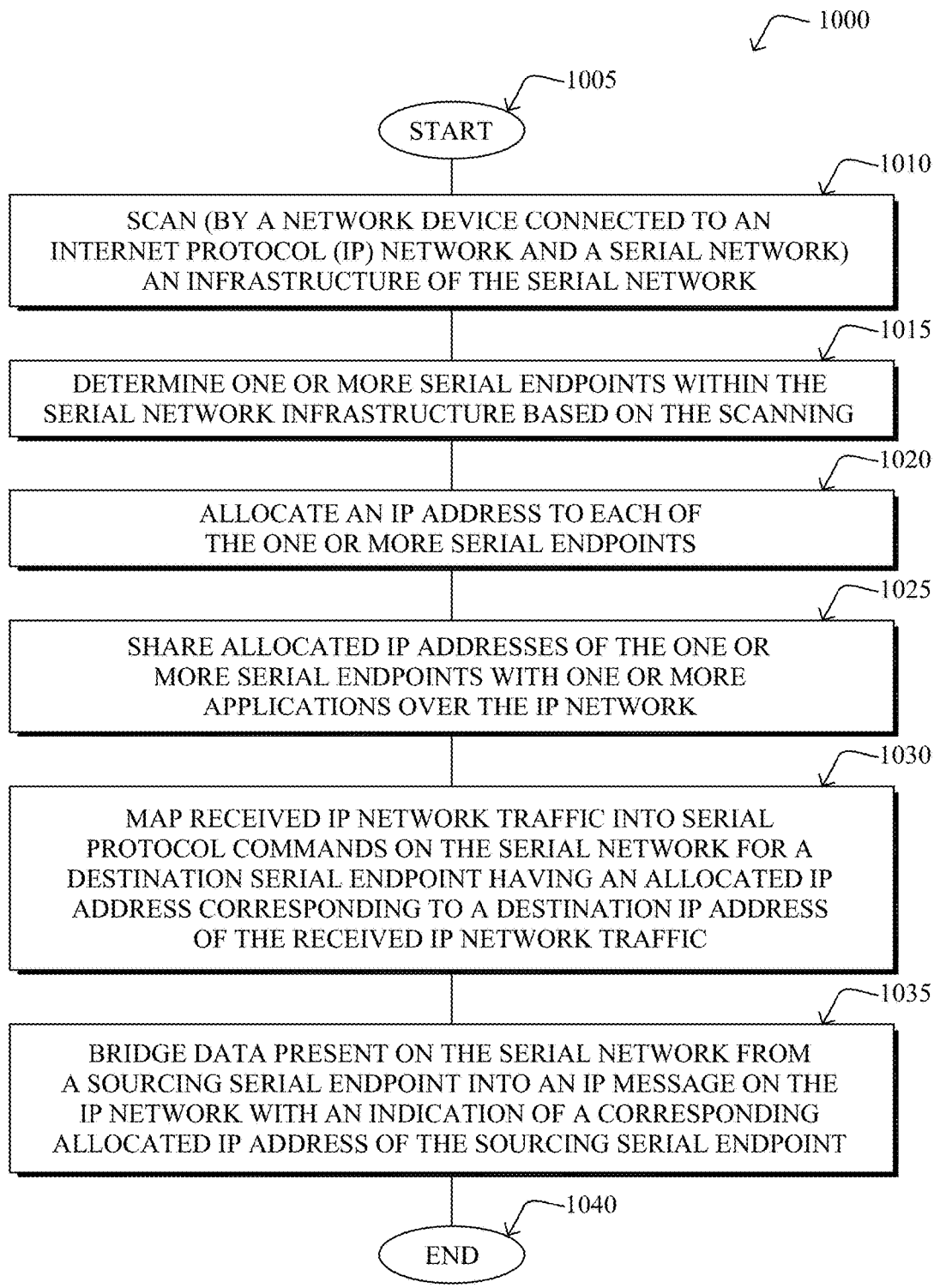
FIG. 10 illustrates an example simplified procedure for IP network virtualization of serial network endpoints.

FIG. 10 illustrates an example simplified procedure for IP network virtualization s of serial network endpoints in accordance with one or more embodiments described herein. For example, a non-generic, specifically configured device (e.g., device 200) may perform procedure 1000 by executing stored instructions (e.g., processes 246 and 248, particularly). The procedure 1000 may start at step 1005, and continues to step 1010, where, as described in greater detail above, a network device 200 connected to an IP io network 110 and a serial network 115 (e.g., gateway 120) may scan an infrastructure of the serial network, and may determine, in step 1015, one or more serial endpoints 130 within the serial network infrastructure based on the scanning (e.g., based on PIDs, station addresses, etc. within the serial network).

In step 1020, the network device may then correspondingly allocate an IP address is to each of the one or more serial endpoints, such as based on either a private network or public network IP address mask, and/or based on delineating endpoint type and/or function, such as described above. The allocated IP addresses of the one or more serial endpoints may be shared with one or more applications (server 140, end devices 142, application devices 144, etc.) over the IP network 110 in step 1025.

Once the serial endpoints 130 are established and addressed, the network device (e.g., gateway 120) in step 1030 may map and received IP network traffic 150 (from IP network 110) into serial protocol commands 155 on the serial network 115 for a destination serial endpoint having an allocated IP address corresponding to a destination IP address of the received IP network traffic. For instance, as described above a server 140 may send a request for information from a particular endpoint EP1 as an IP packet 150 using IP destination address IP1. As such, the network device maps the IP traffic into a serial command 155 directed to endpoint EP1 over the serial network 115, accordingly.

Conversely, and in no particular order with regard to step 1030, in step 1035 the network device may bridge data 155 present on the serial network 115 from a sourcing serial endpoint 130 into an IP message 150 on the IP network 110 with an indication of a corresponding allocated IP address of the sourcing serial endpoint. In one embodiment, s the indication of the corresponding allocated IP address of the sourcing serial endpoint is a source IP address of the IP message 150. In other embodiments, the gateway device may be the source IP address, and a message field or other portion of the message data may be populated with the corresponding IP address of the sourcing serial endpoint.

Note that as described above, the network device may determine the appropriate destination IP address of the IP message 150 from the data present on the serial network, such as by either translating an intelligent serial network destination address (e.g., where the endpoint generally intends the data to reach a specific destination, whether it understands that the destination is actually within the serial network or not), or else by maintaining some degree of state at the gateway 120 (e.g., forwarding an IP message is requesting data to endpoint EP2, and then receiving data from EP2 and assuming that this data is meant to be responsive to the originally forwarded request). Other techniques for determining the appropriate destination IP address may be used, and those mentioned herein are merely meant as examples.

Note further that by communicating the serial network data on the IP network, the gateway effectively provides one or more Layer-7 network functions (HTTP, SSL, etc.) on a per-endpoint basis through the mapping and bridging, as well as other layers of functionality, accordingly, as described above.

The procedure 1000 illustratively ends in step 1040, though notably with the option to continue mapping and/or bridging in steps 1030 and 1035 in real-time, as well as revisiting any of the other steps, such as for updates, connectivity confirmation, handshaking, and so on.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for IP network virtualization of serial network endpoints. In particular, though previous systems focused on decoding the data from a serial interface and copying or moving the data to a destination, the techniques herein discover actual endpoints within the serial network from the data read at the interface and act precisely in a unique way to create a local area network (LAN) io out of the serial network, enabling IP-based services and features on non-IP enabled devices. The techniques herein are particularly relevant in Data-in-Motion and IOT networks, where the router/switch or gateway is enhanced to accomplish functions such as analyzing the data at the edge.

As another example use case, assume a fleet vehicle management environment is employing the techniques herein. Such an environment would have the benefit of a number of features as mentioned above, such as, for example, L1/L2 to L3 LAN Virtualization, TCP/HTTP services, SSL and VPN Northbound, programmability at the edge, multiprotocol capability, network controller functionality, content delivery network (CDN) features (e.g., store & forward, for example, as a "micro-CDN"), and so on. The value of these features within this environment includes, but is not limited to, security WAN/VLAN bridging, PUSH and PULL architectures, edge data subscription models, multi-tenancy (e.g., different endpoints accessible for different consumers, etc.), and many others.

While there have been shown and described illustrative embodiments that provide for IP network virtualization of serial network endpoints, it is to be understood that various other adaptations and modifications may be made within the spirit and scope of the embodiments herein. For example, while certain embodiments are described herein with respect to using certain protocols (e.g., certain IP protocols or serial network protocols), the techniques herein are not limited as such and may be used for other suitable protocols, in other embodiments. In addition, while certain environments are shown or described (e.g., vehicular networks), the techniques herein may be applied to any type of network, such as industrial networks, sensor networks, and so on.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   scanning, by a network device connected between an Internet Protocol (IP) network and a serial network in a vehicle, an infrastructure of the serial network;
   discovering, by the network device and based on data read at the network device from the serial network during the scanning, one or more serial endpoints within the serial network infrastructure of the vehicle and a vehicular functionality for each of the one more serial endpoints;
   in response to discovering one or more serial endpoints, allocating, by the network device and based on the vehicular functionality for each of the one or more serial endpoints, an IP address to each of the one or more serial endpoints within the vehicle;
   mapping, by the network device, received IP network traffic into serial protocol commands on the serial network for a destination serial endpoint having an allocated IP address corresponding to a destination IP address of the received IP network traffic; and
   bridging, by the network device, data present on the serial network from a sourcing serial endpoint into an IP message on the IP network with an indication of a corresponding allocated IP address of the sourcing serial endpoint.

2. The method as in claim 1, wherein the indication of the corresponding allocated IP address of the sourcing serial endpoint is a source IP address of the IP message.

3. The method as in claim 1, wherein bridging comprises:
   determining, by the network device, a destination IP address of the IP message from the data present on the serial network.

4. The method as in claim 1, further comprising:
   sharing allocated IP addresses of the one or more serial endpoints with one or more applications over the IP network.

5. The method as in claim 1, wherein the network device is connects to the serial network via a data link connector.

6. The method as in claim 1, wherein the serial network operates according to a protocol selected from a group consisting of: an on-board diagnostics (OBD) protocol; a controller area network bus (CANBUS) protocol; and a MODBUS protocol.

7. The method as in claim 1, wherein the serial network is a vehicular network.

8. The method as in claim 1, wherein the one or more serial endpoints are determined based on parameter identifiers (PIDs) within the serial network.

9. The method as in claim 1, wherein allocated IP addresses are based on either a private network or public network IP address mask.

10. The method as in claim 1, wherein allocating the IP address to each of the one or more serial endpoints is based on delineating endpoint type and/or function.

11. The method as in claim 1, further comprising:
    providing one or more Layer-7 network functions on a per-endpoint basis through the mapping and bridging.

12. An apparatus, comprising:
    one or more network interfaces to communicate with an Internet Protocol (IP) network and a serial network;
    a processor coupled to the network interfaces and adapted to execute one or more processes; and
    a memory configured to store a process executable by the processor, the process when executed operable to:
       scan an infrastructure of the serial network of a vehicle;
       discover, based on data read at the network device from the serial network during the scanning, one or more serial endpoints within the serial network infrastructure of the vehicle and a vehicular functionality for each of the one or more serial endpoints;
       in response to discovering one or more serial endpoints within the vehicle, allocate, based on the vehicular functionality for each of the one or more serial endpoints, an IP address to each of the one or more serial endpoints;
       map received IP network traffic into serial protocol commands on the serial network for a destination serial endpoint having an allocated IP address corresponding to a destination IP address of the received IP network traffic; and
       bridge data present on the serial network from a sourcing serial endpoint into an IP message on the IP network with an indication of a corresponding allocated IP address of the sourcing serial endpoint.

13. The apparatus as in claim 12, wherein the indication of the corresponding allocated IP address of the sourcing serial endpoint is a source IP address of the IP message.

14. The apparatus as in claim 12, wherein the process when executed to bridge is further operable to:
    determine a destination IP address of the IP message from the data present on the serial network.

15. The apparatus as in claim 12, wherein the process when executed to bridge is further operable to
    share allocated IP addresses of the one or more serial endpoints with one or more applications over the IP network.

16. The apparatus as in claim 12, wherein allocating the IP address to each of the one or more serial endpoints is based on delineating endpoint type and/or function.

17. A tangible, non-transitory, computer-readable media having software encoded thereon, the software, when executed by a processor on a network device connected to an Internet Protocol (IP) network and a serial network, operable to:
    scan an infrastructure of the serial network of a vehicle;
    discover, based on data read at the network device from the serial network during the scanning, one or more serial endpoints within the serial network infrastructure of the vehicle and a vehicular functionality for each of the one or more serial endpoints;
    in response to discovering one or more serial endpoints within the vehicle, allocate, based on the vehicular functionality for each of the one or more serial endpoints, an IP address to each of the one or more serial endpoints;
    map received IP network traffic into serial protocol commands on the serial network for a destination serial endpoint having an allocated IP address corresponding to a destination IP address of the received IP network traffic; and bridge data present on the serial network from a sourcing serial endpoint into an IP message on the IP network with an indication of a corresponding allocated IP address of the sourcing serial endpoint.

18. The computer-readable medium as in claim 17, wherein the indication of the corresponding allocated IP address of the sourcing serial endpoint is a source IP address of the IP message.

19. The computer-readable medium as in claim 17, wherein the software when executed to bridge is further operable to:

determine a destination IP address of the IP message from the data present on the serial network.

20. The computer-readable medium as in claim 17, wherein allocating the IP address to each of the one or more serial endpoints is based on delineating endpoint type and/or function.

* * * * *

UNITED STATES PATENT AND TRADEMARK OFFICE
CERTIFICATE OF CORRECTION

PATENT NO. : 10,333,887 B2
APPLICATION NO. : 15/236918
DATED : June 25, 2019
INVENTOR(S) : David A. Maluf et al.

It is certified that error appears in the above-identified patent and that said Letters Patent is hereby corrected as shown below:

In the Specification

In Column 1, Line 19, please amend as shown:
commands and data consumption occurs on a device also In Column 1, Line 26, please amend as shown:
transparent at the serial interface can represent many In Column 1, Line 57, please amend as shown:
communications into IP messages for IP network virtual- In Column 2, Line 13, please amend as shown:
address of the sourcing serial endpoint, accordingly.

In Column 2, Line 28, please amend as shown:
such as common carrier telephone lines, optical lightpaths, In Column 3, Line 2, please amend as shown:
proprietary protocols that are connected to IP networks by In Column 4, Line 5, please amend as shown:
bridges both the IP network 110 and serial network 115, In Column 4, Line 21, please amend as shown:
etc.) one or more serial network interfaces 215 (e.g., a In Column 5, Line 22, please amend as shown:
110. In particular, in proactive routing, connectivity is Signed and Sealed this
Third Day of March, 2020

Andrei Iancu
*Director of the United States Patent and Trademark Office*

CERTIFICATE OF CORRECTION (continued)
U.S. Pat. No. 10,333,887 B2

In Column 5, Line 38, please amend as shown:
such endpoints are natively not enabled for IP communi- In Column 5, Line 67, please amend as shown:
into a LAN to be addressed, virtually as if it were a true In Column 6, Line 41, please amend as shown:
serial interface. With reference to FIG. 3, and as described In Column 7, Line 24, please amend as shown:
appreciated by those skilled in the art). In addition, the In Column 7, Line 31, please amend as shown:
endpoint (e.g., as determined by the gateway itself and In Column 8, Line 9, please amend as shown:
the intermediary between IP network 110 and the serial In Column 8, Line 34, please amend as shown:
identifies itself (EP2) and its data payload. In either of In Column 9, Line 11, please amend as shown:
network virtualization of serial network endpoints in In Column 9, Line 18, please amend as shown:
above, a network device 200 connected to an IP network In Column 9, Line 26, please amend as shown:
ingly allocate an IP address to each of the one or more In Column 9, Line 51, please amend as shown:
the sourcing serial endpoint. In one embodiment, the In Column 9, Line 66, please amend as shown:
at the gateway 120 (e.g., forwarding an IP message In Column 10, Line 32, please amend as shown:
area network (LAN) out of the serial network, enabling In Column 10, Line 39, please amend as shown:
management environment employing the techniques